(12) United States Patent
Nagata et al.

(10) Patent No.: US 9,290,125 B2
(45) Date of Patent: Mar. 22, 2016

(54) HAPTIC ALERT SYSTEM FOR A VEHICLE

(71) Applicant: Toyota Motor Engineering & Manufacturing North America, Inc., Erlanger, KY (US)

(72) Inventors: Katsumi Nagata, Ann Arbor, MI (US); Charan Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 80 days.

(21) Appl. No.: 14/194,796

(22) Filed: Mar. 2, 2014

(65) Prior Publication Data

US 2015/0246639 A1 Sep. 3, 2015

(51) Int. Cl.
*B60Q 1/00* (2006.01)
*B60Q 9/00* (2006.01)
*G08B 6/00* (2006.01)

(52) U.S. Cl.
CPC . *B60Q 9/008* (2013.01); *G08B 6/00* (2013.01)

(58) Field of Classification Search
CPC .............................. B60Q 9/008; G08B 1/0962
USPC .......... 340/435, 438, 439, 540, 541, 903, 905
See application file for complete search history.

(56) References Cited

U.S. PATENT DOCUMENTS

| 7,705,522 | B2 | 4/2010 | Gandhi | |
| 8,144,889 | B2 | 3/2012 | Cheng et al. | |
| 8,669,857 | B2* | 3/2014 | Sun et al. | 340/438 |
| 2010/0014711 | A1* | 1/2010 | Camhi et al. | 382/104 |
| 2015/0094118 | A1* | 4/2015 | Rodolico | 455/566 |

FOREIGN PATENT DOCUMENTS

WO 2013/134340 9/2013

* cited by examiner

*Primary Examiner* — Tai T Nguyen
(74) *Attorney, Agent, or Firm* — Christopher G. Darrow; Darrow Mustafa PC

(57) ABSTRACT

A haptic alert system for use in a vehicle includes a sensor system operable to identify a condition associated with the vehicle; a control system in communication with the sensor system; and a remote haptic device in communication with the sensor system.

18 Claims, 2 Drawing Sheets

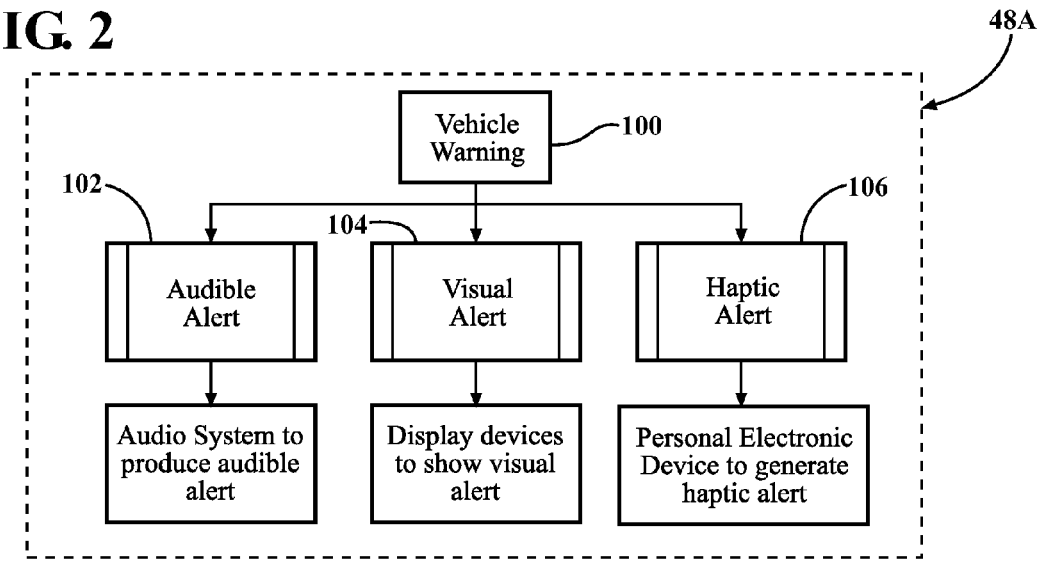
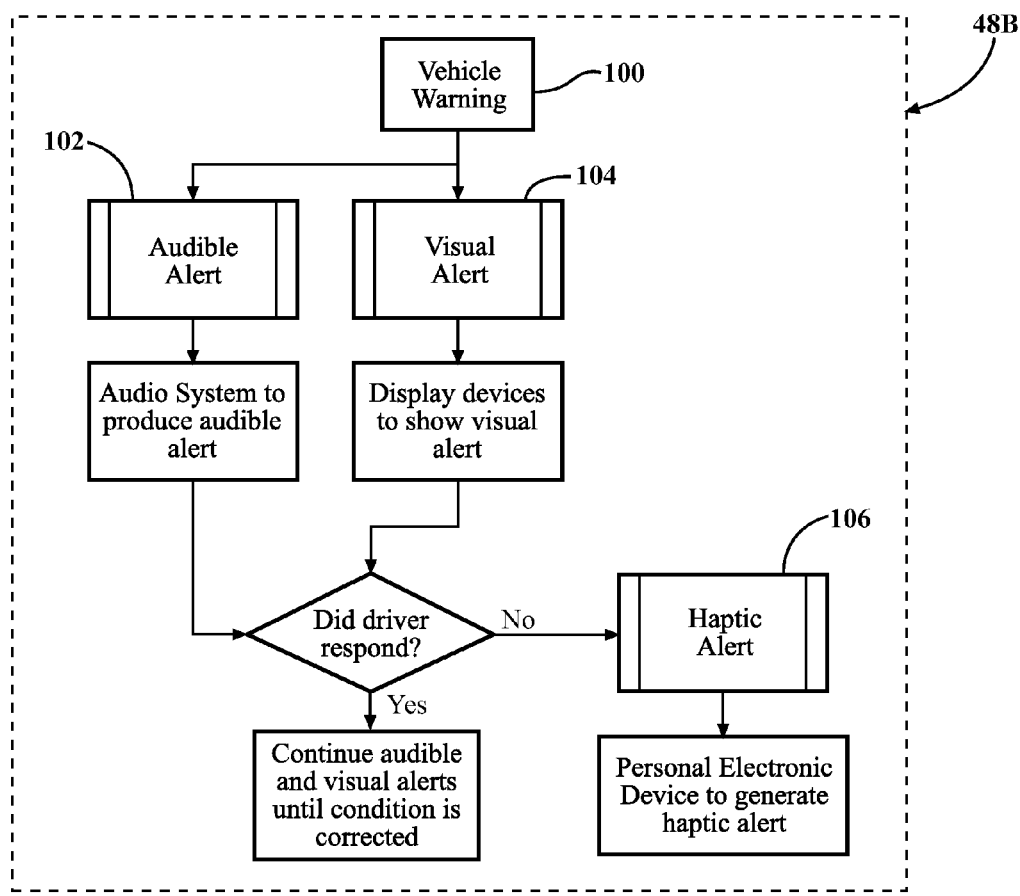

HAPTIC ALERT SYSTEM FOR A VEHICLE

BACKGROUND

The present disclosure relates to a vehicle and more particularly to a haptic-based alert system therefor.

Vehicles often include systems to alert a driver to the environment around the vehicle. A typical conventional haptic-based alert system utilizes vibro-tactile devices and/or lights to alert a driver to an adjacent vehicle or to warn a driver when the vehicle drifts out of a designated lane. Although effective, these haptic-based alert systems utilize mechanical actuators in the vehicle such as the vehicle seat or lights on a vehicle dashboard to provide the desired haptic alert. Although effective, it may be relatively complicated to couple the output to the driver.

SUMMARY

A haptic alert system for a vehicle is operable to identify a condition associated with the vehicle and alert a remote haptic device in a personal electronic device of a vehicle occupant. Furthermore, if the driver does not timely respond, the haptic alert system may also alert a personal electronic device of a vehicle passenger such that the passenger may check on the driver.

A haptic alert system for a vehicle according to one disclosed non-limiting embodiment of the present disclosure includes a sensor system operable to identify a condition associated with the vehicle; a control system in communication with the sensor system; and a remote haptic device in communication with the sensor system.

A haptic alert system for a vehicle according to another disclosed non-limiting embodiment of the present disclosure includes a remote haptic device operable to receive an alert in response to a condition associated with the vehicle.

A method for alerting an occupant of a vehicle according to another disclosed non-limiting embodiment of the present disclosure includes identifying a condition associated with the vehicle; and activating a remote haptic device in response to the condition associated with the vehicle.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 is a flow chart illustrating operations of the haptic-based alert system according to one disclosed non-limiting embodiment; and FIG. 3 is a flow chart illustrating operations of the haptic-based alert system according to another disclosed non-limiting embodiment.

DETAILED DESCRIPTION

Figure 1:
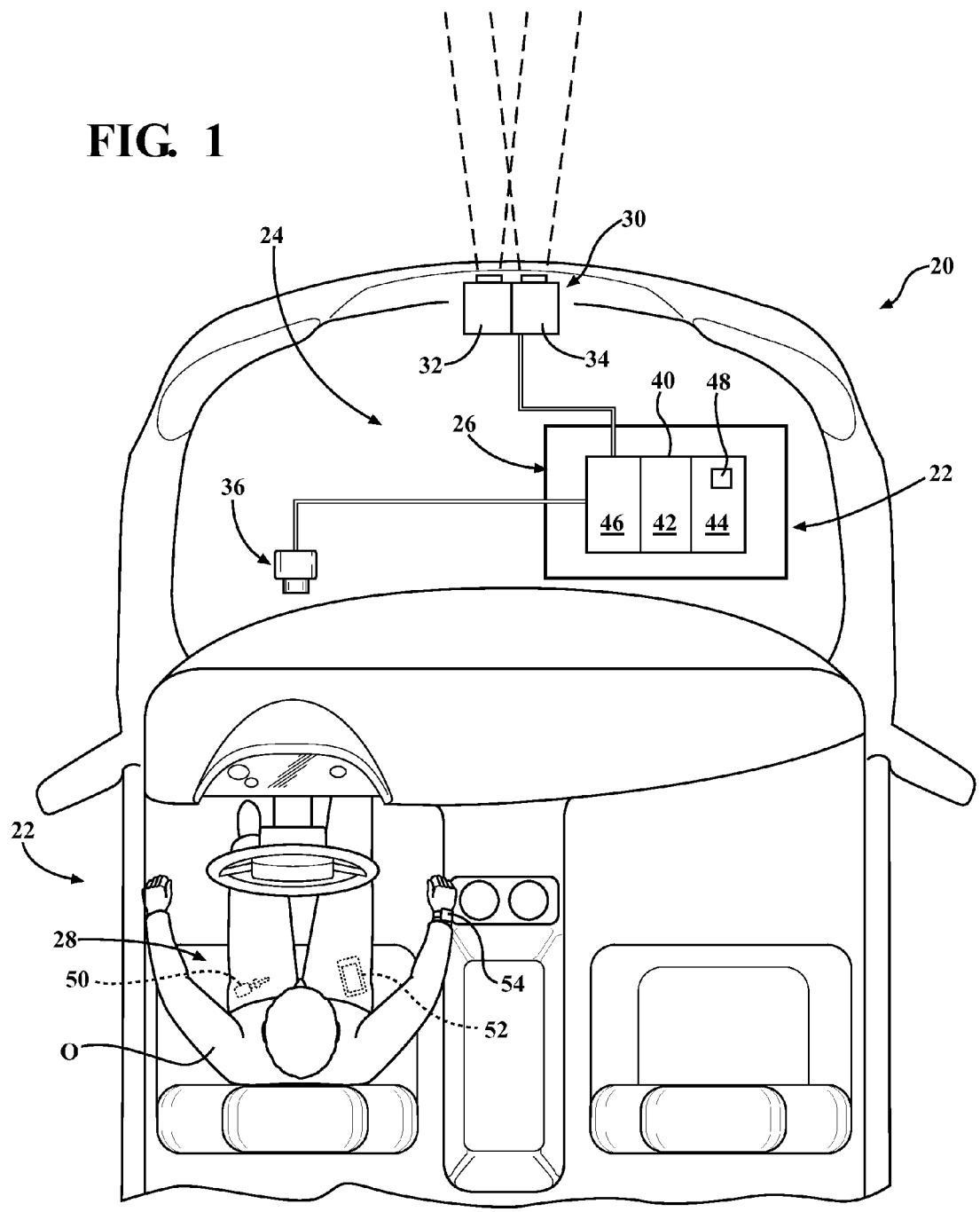
FIG. 1 is a schematic view of an example vehicle for use with a haptic-based alert system.

FIG. 1 schematically illustrates a vehicle 20 with a haptic alert system 22. Although a particular vehicle configuration is illustrated in the disclosed, non-limiting embodiment, it should be appreciated that various vehicle types will also benefit herefrom.

The haptic alert system 22 generally includes a sensor system 24, a control system 26 and a remote haptic device 28. It should be appreciated that although particular systems are separately defined, each or any of the systems may be otherwise combined or segregated via hardware and/or software of the haptic alert system 22.

The sensor system 24 may include various sensors operable to identify a condition associated with the vehicle 20 such as a condition around the vehicle 20 and/or a condition of the driver. In one disclosed non-limiting embodiment, one or more vehicle sensors 30 are directed outside of the vehicle 20 to identify a condition around the vehicle to include, but not be limited to, a lane monitoring device 32 that assures the vehicle is not straying from its lane, a distance measurement device 34 that identifies a closing rate relative to another vehicle or other sensor. Examples of such sensors include, but are not limited to, RADAR, SONAR, laser, LIDAR and/or other optical sensors and combinations thereof.

The sensor system 24 may alternatively or additionally include a driver sensor 36 directed within the vehicle 20 such as a device operable to identify whether the driver is drowsy or otherwise impaired. An example of the driver sensor 36 includes, but is not limited to, an eye monitoring sensor and facial recognition sensor. It should be appreciated that these are mere examples and are not to be considered limiting.

The control system 26 generally includes a control module 40 with a processor 42, a memory 44, and an interface 46. The processor 42 may be any type of microprocessor having desired performance characteristics. The control module 40 may be a portion of a central vehicle control, a stand-alone unit or other system such as a cloud-based system. Other operational software for the processor 42 may also be stored in the memory 44. The memory 44 may include any type of computer readable medium that stores the data and control algorithms 48 described herein. The functions of some such control algorithms 48 are disclosed in terms of functional block diagrams (FIGS. 2 and 3) and it should be appreciated by those skilled in the art with the benefit of this disclosure that these functions may be enacted in either dedicated hardware circuitry or programmed software routines capable of execution in a microprocessor based electronics control embodiment.

The interface 46 facilitates communication with other systems such as the sensor system 24, the haptic alert system 22 and other onboard and offboard vehicle systems. Onboard systems include but are not limited to, a vehicle head unit that communicates with vehicle sensors that provide, for example, vehicle diagnostic information. Offboard vehicle systems provide information to include, but not limited to, weather reports, traffic, and other information. The interface 46 may include wired and wireless communication such as wireless radios using various types of wireless data communication protocols communication, e.g., Bluetooth™, ZigBee, ANT™, WiFi, WiMax, and other wireless technology standards to exchange data.

The remote haptic device 28 may include, or be included in via software, various devices such as, for example, a key fob 50, a personal electronic device 52 of the vehicle occupant O, e.g. a tablet, smart phone, or other mobile device, or a wearable device 54, e.g., a watch, eyeglasses, or other. That is, the remote haptic device 28 in this disclosed non-limiting embodiment is a device typically carried or worn by the driver that typically has an alert capability such as a vibration capability. The vibration capability may be implemented as a microvibrator or motor configured to provide a vibratory signal for an alert or other indicator to provide a direct alert sensation to the driver without the necessity of additional hardware being installed within the vehicle such as a vibrating seat, steering wheel, etc.

In a disclosed non-limiting embodiment, the remote haptic device 28 may be incorporated into a personal electronic device 52 of not only the driver but also a passenger. That is, a passenger may interact with the haptic alert system 22 through wireless communication such that if the haptic alert system 22 determines that the driver is becoming drowsy, the passenger(s) can be alerted via their personal electronic device 52. It should be appreciated that vehicle occupant O as defined herein includes both the driver and the passenger(s).

With reference to FIG. 2, in one disclosed non-limiting embodiment, a method for alerting an occupant within the vehicle 20 generally includes identifying a condition associated with the vehicle and activating the remote haptic device in response to the condition associated with the vehicle. For example, an algorithm 48A may utilize a vehicle warning 100 from an onboard or off board device to trigger an audible alert 102 and/or a visual alert 104 in parallel with a haptic alert 106 as desired. That is, the haptic alert system 22 may be activated in parallel with the audible alert 102 and the visual alert 104. It should be appreciated that various audible and/or visual alerts may be utilized.

With reference to FIG. 3, in another disclosed non-limiting embodiment, the algorithm 48B may operate the haptic alert 106 downstream of the vehicle warning 100 after an audible alert 102 and/or a visual alert 104 to further increase notification and feedback to the driver. For example, if the driver did not respond to the audible alert 102 and/or the visual alert 104, the haptic alert 106 is thereafter activated to raise the level of the alert and further gain the attention of the driver. Furthermore, if the driver does not provide a timely response to the audible alert 102 and/or the visual alert 104, the haptic alert 106 may also then alert the vehicle passengers so the passenger or passengers may check on the driver.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. An alert system for a vehicle, comprising:
a sensor system operable to identify conditions associated with the vehicle, the sensor system including:
at least one of an eye monitoring sensor and a facial recognition sensor operable to identify whether a driver of the vehicle is impaired,
a lane monitoring device operable to identify whether the vehicle is straying from a lane, and
a distance measurement device operable to identify a closing rate relative to another vehicle;
an in-vehicle alert system, the in-vehicle alert system operable to provide at least one of an audible or a visual alert to the driver;
a remote haptic device, the remote haptic device carriable or wearable by the driver, and operable to provide an alert to the driver when carried or worn; and
a control system in communication with the sensor system, the in-vehicle alert system and the remote haptic device, the control system operable to:
activate the in-vehicle alert system to provide at least one of an audible or a visual alert to the driver in response to a condition associated with the vehicle identified by the sensor system, and
if the driver does not respond to the at least one of the audible or visual alert, activate the remote haptic device to provide an alert to the driver.

2. The system as recited in claim 1, wherein the remote haptic device is a watch.

3. The system as recited in claim 1, wherein the remote haptic device is a key fob.

4. The system as recited in claim 1, wherein the remote haptic device is a personal electronic device.

5. The system as recited in claim 1, wherein the condition associated with the vehicle includes a condition around the vehicle.

6. The system as recited in claim 1, wherein the lane monitoring device includes at least one of RADAR, SONAR, laser, LIDAR and an optical camera.

7. The system as recited in claim 1, wherein the at least one of an audible or a visual alert is an audible alert.

8. The system as recited in claim 1, wherein the at least one of an audible or a visual alert is a visual alert.

9. The system as recited in claim 1, wherein the at least one of an eye monitoring sensor and a facial recognition sensor is an eye monitoring sensor.

10. The system as recited in claim 1, wherein
the at least one of an eye monitoring sensor and a facial recognition sensor is a facial recognition sensor.

11. The system as recited in claim 1, wherein the distance measurement device includes at least one of RADAR, SONAR, laser, LIDAR and an optical camera.

12. A method for alerting a driver of a vehicle, comprising:
identifying, with at least one of an eye monitoring sensor and a facial recognition sensor, whether the driver of the vehicle is impaired;
identifying, with a lane monitoring device, whether the vehicle is straying from a lane;
identifying, with a distance measurement device, a closing rate relative to another vehicle;
in response to at least one of an identification that the driver of the vehicle is impaired, that the vehicle is straying from a lane and of a closing rate relative to another vehicle, activating an in-vehicle alert system to provide at least one of an audible or a visual alert to the driver; and
if the driver does not respond to the at least one of the audible or visual alert, activating a remote haptic device carried or worn by the driver to provide an alert to the driver.

13. The method as recited in claim 12, wherein the activating the remote haptic device includes vibrating.

14. The method as recited in claim 12, wherein the remote haptic device is activated through a wireless communication.

15. The method as recited in claim 12, wherein the at least one of an audible or a visual alert is an audible alert.

16. The method as recited in claim 12, wherein the at least one of an audible or a visual alert is a visual alert.

17. The method as recited in claim 12, wherein the at least one of an eye monitoring sensor and a facial recognition sensor is an eye monitoring sensor.

18. The method as recited in claim 12, wherein the at least one of an eye monitoring sensor and a facial recognition sensor is a facial recognition sensor.

* * * * *